(12) United States Patent
Tan et al.

(10) Patent No.: US 10,354,682 B2
(45) Date of Patent: Jul. 16, 2019

(54) THIN DATA READER CAP

(71) Applicant: Seagate Technology LLC, Cupertino, CA (US)

(72) Inventors: Liwen Tan, Eden Prairie, MN (US); ZhiGuo Ge, Edina, MN (US); Shaun E. McKinlay, Eden Prairie, MN (US); Jae-Young Yi, Prior Lake, MN (US); Stacey C. Wakeham, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/021,731

(22) Filed: Jun. 28, 2018

(65) Prior Publication Data

US 2018/0308515 A1    Oct. 25, 2018

Related U.S. Application Data

(62) Division of application No. 15/013,158, filed on Feb. 2, 2016, now abandoned.

(51) Int. Cl.
*G11B 5/39* (2006.01)
*G11B 5/31* (2006.01)

(52) U.S. Cl.
CPC .......... *G11B 5/3912* (2013.01); *G11B 5/3163* (2013.01)

(58) Field of Classification Search
None
See application file for complete search history.

(56) References Cited

U.S. PATENT DOCUMENTS

| | | | |
|---|---|---|---|
| 6,208,491 B1 | 3/2001 | Pinarbasi | |
| 6,729,014 B2 | 5/2004 | Lin | |
| 6,780,524 B2 | 8/2004 | Lin | |
| 7,112,861 B2* | 9/2006 | Kanakasabapathy | ... H01L 43/12 257/421 |
| 7,126,796 B2 | 10/2006 | Lin | |
| 7,190,557 B2 | 3/2007 | Li | |
| 7,528,457 B2 | 5/2009 | Horng | |
| 7,595,520 B2* | 9/2009 | Horng | ..................... B82Y 25/00 257/295 |
| 7,820,455 B2* | 10/2010 | Gill | ......................... B82Y 10/00 257/295 |
| 8,169,753 B2 | 5/2012 | Lin | |
| 8,238,063 B2 | 8/2012 | Qiu et al. | |
| 8,422,168 B2* | 4/2013 | Hsiao | ...................... G11B 5/112 360/125.07 |
| 8,470,462 B2* | 6/2013 | Horng | .................. C23C 14/3414 365/158 |
| 8,508,886 B2* | 8/2013 | Chen | ..................... G11B 5/3116 360/125.3 |
| 8,531,801 B1 | 9/2013 | Xiao | |

(Continued)

FOREIGN PATENT DOCUMENTS

EP    1124273 A2    8/2001

*Primary Examiner* — William J Klimowicz
(74) *Attorney, Agent, or Firm* — Hall Estill Attorneys at Law

(57) ABSTRACT

A data reader may have a magnetoresistive stack with a magnetically free layer decoupled from a first shield by a cap. The cap can have one or more sub-layers respectively configured with a thickness of 4 nm or less as measured parallel to a longitudinal axis of the magnetoresistive stack on an air bearing surface.

20 Claims, 3 Drawing Sheets

(56) References Cited

U.S. PATENT DOCUMENTS

| | | | |
|---|---|---|---|
| 8,673,161 B2 * | 3/2014 | Bonhote | G11B 5/1278 |
| | | | 216/22 |
| 8,922,954 B2 | 12/2014 | Cao et al. | |
| 9,082,958 B2 | 7/2015 | Lu et al. | |
| 9,099,115 B2 | 8/2015 | Braganca et al. | |
| 9,177,575 B1 | 11/2015 | Gao et al. | |
| 9,396,742 B1 | 7/2016 | Yang | |
| 2002/0024778 A1 | 2/2002 | Xue | |
| 2004/0047082 A1 | 3/2004 | Han | |
| 2004/0252416 A1 | 12/2004 | Horng | |
| 2007/0243638 A1 | 10/2007 | Horng | |
| 2012/0184053 A1 * | 7/2012 | Sakamoto | B82Y 25/00 |
| | | | 438/3 |
| 2012/0187079 A1 * | 7/2012 | Mashima | G01R 33/098 |
| | | | 216/22 |
| 2014/0154529 A1 | 6/2014 | Yang | |
| 2015/0085395 A1 | 3/2015 | Yoshida | |
| 2017/0084828 A1 * | 3/2017 | Hsu | H01L 43/12 |
| 2017/0221506 A1 * | 8/2017 | Tan | G11B 5/3906 |

\* cited by examiner

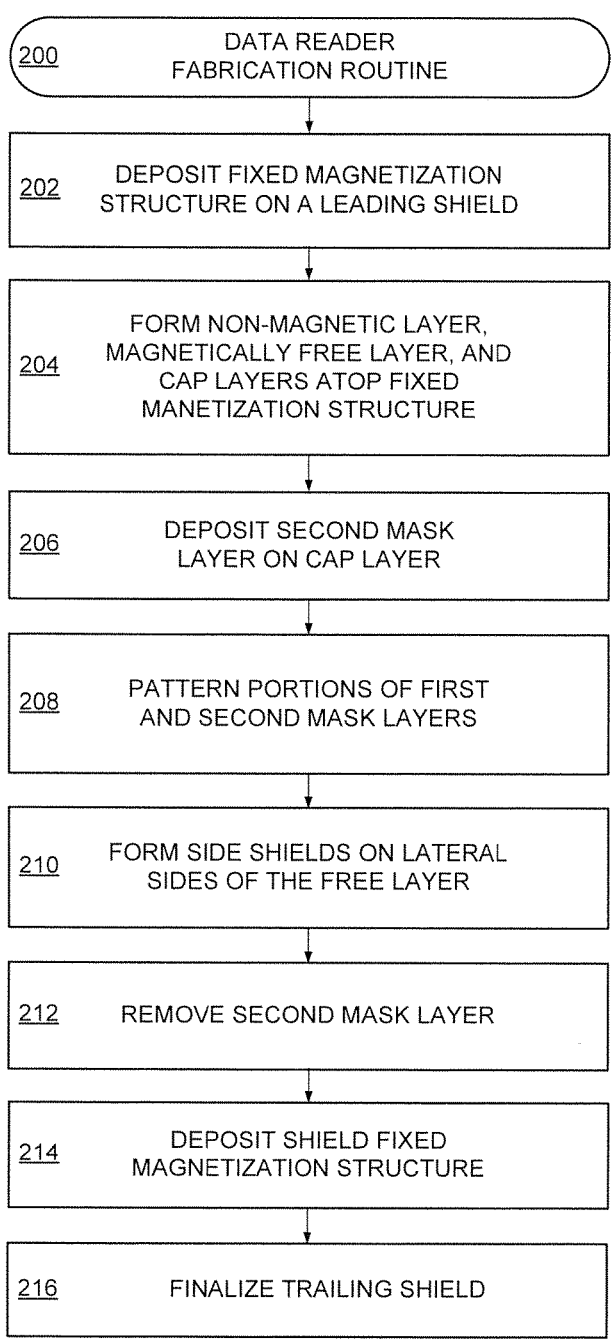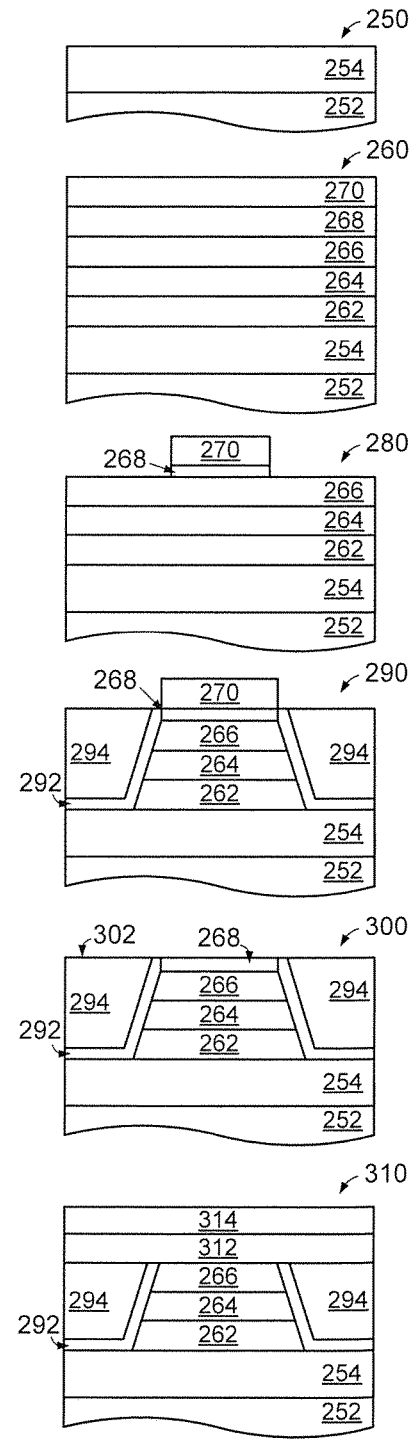
FIG. 5A
FIG. 5B

THIN DATA READER CAP

RELATED APPLICATION

The present application is a divisional of co-pending U.S. patent application Ser. No. 15/013,158 filed on Feb. 2, 2016.

SUMMARY

A data reader, in accordance with various embodiments, is configured with a cap that is composed of chemically different layers. A data reader can have a magnetoresistive stack with a magnetically free layer decoupled from a first shield by a cap. The cap may have cap and mask layers with the cap layer having a thickness of 4 nm or less as measured parallel to the longitudinal axis of the magnetoresistive stack on an air bearing surface.

BRIEF DESCRIPTION OF THE DRAWINGS

FIGS. 5A & 5B respectively convey an example data reader fabrication routine carried out in accordance with various embodiments.

DETAILED DESCRIPTION

To advance data capacity, the recording density of data in a data storage device increases and data reader structures must be reduced in size. However, formation of reduced data reader dimensions can be difficult due at least to process variability in fabricating thin films with nanometer dimensions. Hence, there is a continued goal to provide a data reader with reduced dimensions and less susceptibility to fabrication variability.

To address that goal, a data reader, in some embodiments, has a magnetoresistive stack with a magnetically free layer decoupled from a first shield by a cap that has a stack cap layer and a first mask layer with the stack cap layer having a thickness of 4 nm or less as measured parallel to the longitudinal axis of the magnetoresistive stack on an air bearing surface (ABS). The reduced dimensions of the cap allows the magnetoresistive stack to have a smaller width with less reader width offset, which is characterized as the difference between a patterned mask width and a finished sensor reader width. A narrower data reader width allows narrower data track dimensions that increases overall data capacity and optimizes signal strength versus position of a data bit in relation to the reader's centerline.

Figure 1:
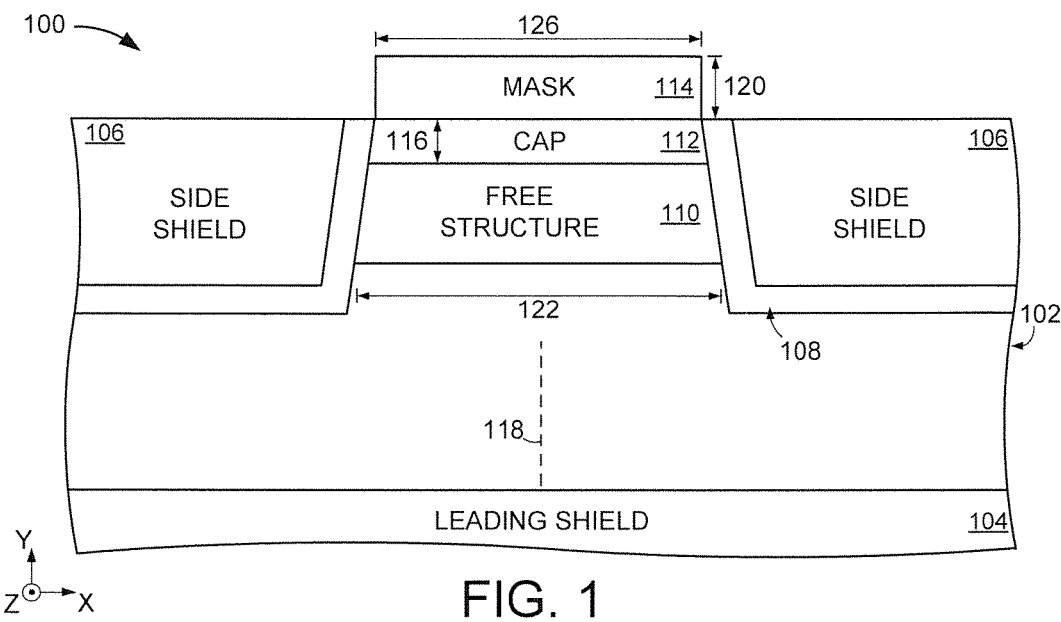
FIG. 1 displays an air bearing view line representation of a portion of an example data reader arranged in accordance with various embodiments.

While a data reader employing a thin cap can be utilized in an unlimited variety of environments and systems, FIG. 1 provides block representation of a portion of an example data reader 100 that can be tuned and employed in a data storage system in accordance with various embodiments. It is noted that anisotropic magnetoresistive (AMR) sensors, tunneling magnetic resistance (TMR) sensors and giant magnetoresistance (GMR) sensors can utilize various embodiments of the present disclosure. Assorted embodiments are directed to magnetoresistive sensors based on new physical phenomena, such as lateral spin valve (LSV), spin-hall effect (SHE), and spin torque oscillation (STO), and may also include devices with configurations such as multiple stacked sensors. The data reader 100 has a magnetoresistive (MR) stack 102 that can be disposed vertically between magnetic shields, of which a leading shield 104 is shown in FIG. 1. The MR stack 102 can also be shielded by side shields 106 separated from the stack 102 by insulating layers 108.

It is noted that the terms "leading" and "trailing" are not limiting and are meant to denote the shields position relative to data bits rotating on an adjacent data storage medium. It is also noted that the vertical direction is aligned with the Y axis and can be characterized as a downtrack direction that is perpendicular to the lateral direction that is aligned with the X axis and can be characterized as a crosstrack direction.

The MR stack 102 can be an unlimited variety of laminations that can discern between data bits written on a data storage medium. The free structure 110 can be one or more magnetic and non-magnetic layers that are magnetically sensitive to external magnetic bits, despite having a default magnetization direction that may be set by one or more biasing elements in the data reader 100.

Although not required or limiting, fabrication of at least a cap layer 112 portion of the MR stack 102 can position a mask 114 in contact with the cap layer 112. The cap layer 112 is designed with a thickness 116, as measured parallel to the Y axis and longitudinal axis 118 of the stack 102, that protects a free structure 110 of the MR stack 102 from being oxidized and damaged in the sequential manufacture operations. If the cap thickness 116 is relatively thick, such as 6 nm or more, the mask thickness 120 in combination with the cap thickness 116 result in shadowing and/or redeposition effects during formation of the MR reader width 122 that produce a reader width offset that is measured as the difference between the reader width 122 and the mask width 126. Thus, a thicker cap layer 112 can result in greater width offset and larger reader width 122.

The reader width offset can increase the size of the reader width 122 and inhibit the construction of designed reader 100 dimensions. However, there is a balance between cap thickness 116 and enough cap material to protect the free structure 110 from damage and instability. For example, thinner cap layer thicknesses 116 can result in degraded strength of magnetic biasing field on free layer structure 110, which can cause free layer instability.

Figure 2:
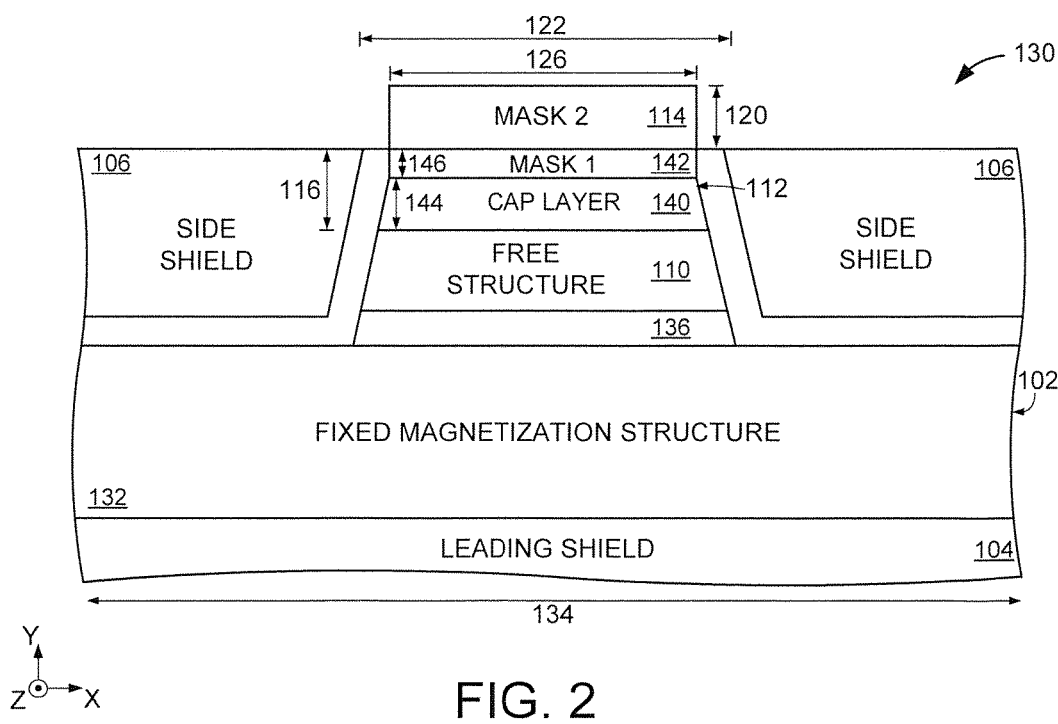
FIG. 2 shows an air bearing view line representation of a portion of an example data reader configured in accordance with some embodiments.

With these issues in mind, a data reader 130 can be configured with multiple processing layers in accordance with assorted embodiments, as illustrated in the ABS view line representation of FIG. 2. The data reader 130 has a magnetoresistive stack 102 that employs a fixed magnetization structure 132 that can be one or more magnetic and non-magnetic layers that retain a fixed magnetization orientation in response to encountering a data bit. The fixed magnetization structure 132 has a width 134 along a crosstrack direction, parallel to the X axis, that is greater than the reader width 122, which can increase stability of the data reader 130 despite nanometer scale dimensions. It is noted that the fixed magnetization structure 132 can be configured with any uniform or varying width 134 on the ABS, such as the reader width 122.

The fixed magnetization structure 132 is separated from the free structure 110 by a non-magnetic layer 136 that can be a spacer or barrier depending on the material selection. To provide a reduced reader width 122 with decreased reader width offset, the cap 112 is configured as a lamination of a cap layer 140 and a first mask layer 142 that act in concert with the second mask layer 114 to protect the free structure 110 during fabrication. Hence, the tuning of the material and dimensions of the cap layer 140 and first mask layer 142 can mitigate reader width offset and allow for decreased cap thickness 144 and reader width 122 in a finished reader configuration.

Various embodiments construct the respective cap layer 140 and first mask layer 142 with materials that prevent magnetoresistive stack 102 degradation during processing and are resistant to oxidation, such as platinum-group based materials like Ir, Ru, and Pt. The cap layer 140 and first mask layer 142 can be dissimilar materials and thicknesses 144 and 146 with the first cap layer 140 having a larger thickness 144 in some embodiments. Although not limiting, the first mask layer 142 can be a conductive material that is a metal, such as Pt or Ta, an oxide, such as $SiO_2$, and a nitride, such as TaN. The first mask layer 142 may be arranged to be an oxide or nitride, such as CuN, at room temperature that decomposes at high temperature to ensure conductivity. That is, layers 140 and 142 can be chemically different, which can be selected during reactive etching of layer 142.

The material selection of the cap layer 140 and first mask layer 142 can allow different material removal means to be used to pattern or eliminate the respective layers. In other words, the cap layer 140 can be configured to be inert to reactive etching while the first mask layer 142 is inert to the other etching material removal means. It is also contemplated that one, or both, of the cap layer 140 and first mask layer 142 can act as a chemical mechanical polish stop.

Figure 3:
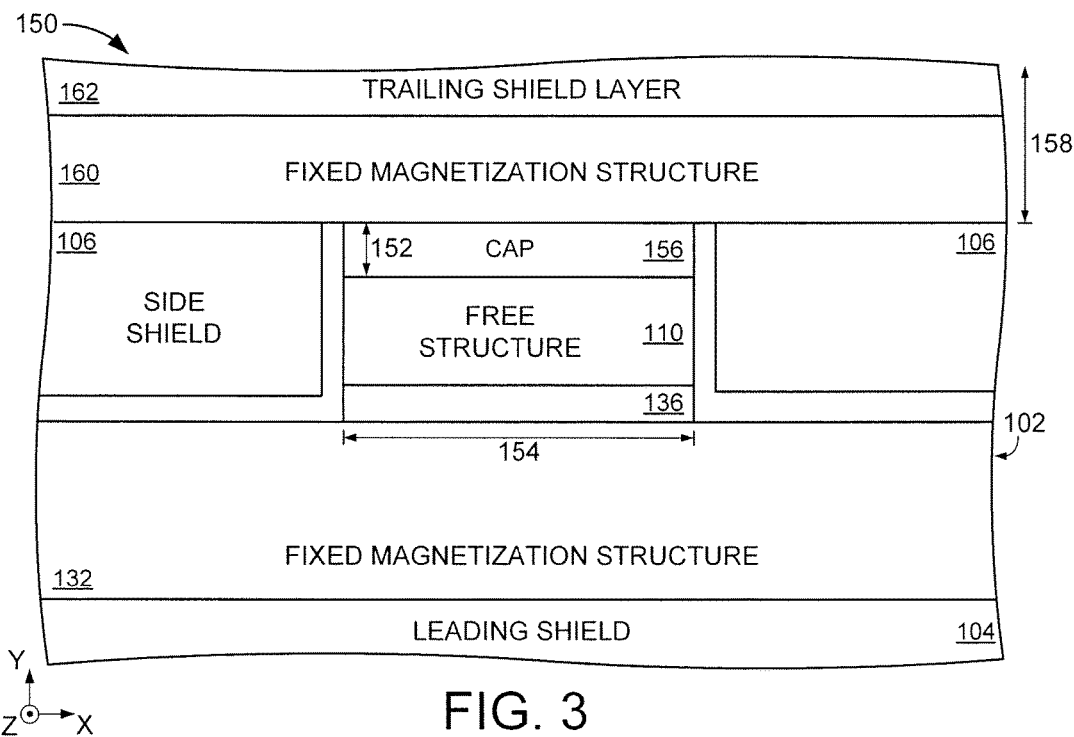
FIG. 3 is an air bearing view line representation of a portion of an example data reader arranged in accordance with assorted embodiments.

FIG. 3 displays an ABS view line representation of a portion of an example data reader 150 arranged in accordance with some embodiments with a reduced cap thickness 152 and decreased stack width 154. It is noted that the cap 156 shown in data reader 150 can be a single layer, such as cap layer 140, or a bi-layer lamination of the similar or dissimilar materials, such as Ir, Ru, and Pt. After the second mask layer 114 and whatever portion of the cap layer 140 have been removed and patterned, the magnetoresistive stack 102 is disposed between and contacting leading 104 and trailing 158 shields. In some embodiments, the trailing shield 158 is characterized as a first shield and the leading shield 104 is characterized as a second shield.

While not required or limiting, one, or both, shields 104 and 158 can have a fixed magnetization structure 160, which may be a single magnetic material or a synthetic antiferromagnet (SAF) lamination of layers pinned by an antiferromagnetic material. As shown, the trailing shield 158 has a shield layer 162 contacting the fixed magnetization structure 160. The shield layer 162 can be one or more materials and layers that can complement the fixed magnetization structure 160 to provide optimized shielding of stray magnetic flux from the magnetoresistive stack 102.

Although not required, the fixed magnetization structure 160 of the trailing shield 158 can be coupled to and magnetically stabilize the respective side shields 106. It is contemplated that at least one seed layer can be positioned between the side shields 106 and/or magnetoresistive stack 102 and the trailing shield 158, which can promote coupling and/or crystallographic formation of the various materials of the fixed magnetization structure 160. The fixed magnetization structure 160 can have one or more magnetizations that can be parallel to the X axis, or canted at a non-normal angle with respect to the X-Y plane and ABS.

The tuned materials, number of layers, and magnetizations of the trailing shield 158 is physically and magnetically separated from the free structure 110 by the cap 156. In some embodiments, the thickness 152 of the cap 156 is tuned to provide a predetermined bias on the free structure 110 that stabilizes data reader 150 operation without degrading the free structure's 110 accuracy in sensing encountered data bits. It is noted that the magnetoresistive stack 102 in reader 150 has a generally rectangular shape. This is not required or limiting, as the stack 102 can have canted sidewalls that generally define a trapezoidal shape proximal the free structure 110 as displayed in readers 100 and 130.

Figure 4:
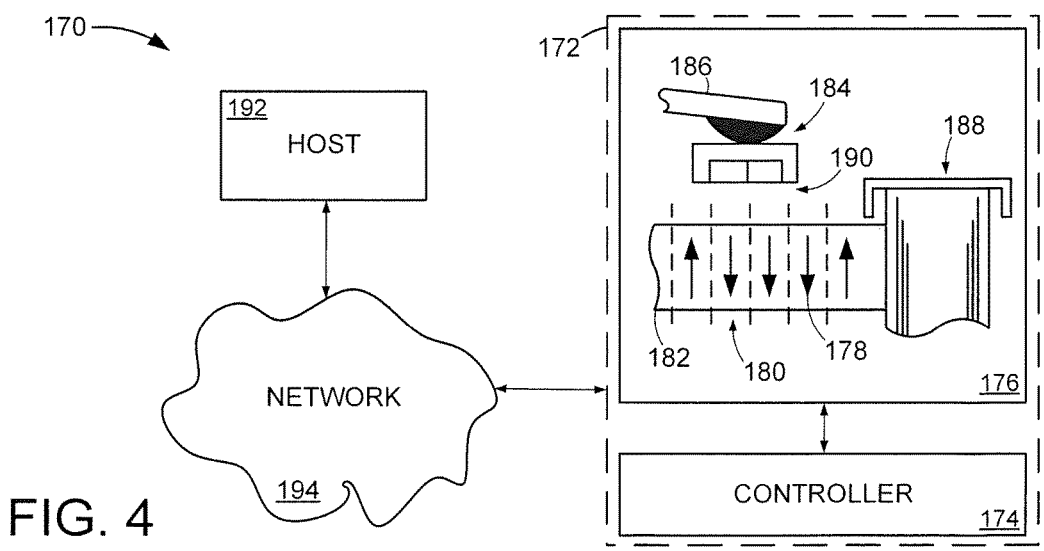
FIG. 4 is a block representation of an example data storage system configured and operated in accordance with some embodiments.

FIG. 4 displays a block representation of a portion of an example data storage system 170 in which a tuned data reader can be commissioned in accordance with some embodiments. Although not required or limiting, the data storage system 170 can have one or more data storage devices 172 that are configured with at least one data storage means. It is contemplated that various solid-state volatile and non-volatile memories can be used as data storage means.

Assorted embodiments arrange at least one data storage device 172 of the data storage system 170 as a hard disk drive with at least one local controller 174 directing operations of a transducing assembly 176 that consists of a plurality of data bits 178 stored in various data track 180 portions of a data storage medium 182. One or more data bits 178 can be accessed individually, concurrently, and successively by a transducing head 184 suspended from an actuating assembly 186 to present data reader and data writer components. In operation, a spindle 188 can rotate the data storage medium 182 to produce an air bearing 190 on which the head 184 flies, as directed by the controller 174.

While the data storage device 172 can operate solely with the local controller 174, various embodiments connect the data storage device 172 with at least one remote host 192 via a wired and/or wireless network 194. The remote connection of the data storage device 172 allows the remote host 192 to provide additional processing, data storage, and security capabilities without impinging on the operation of the data storage device 172. It is contemplated that the data storage system 170 can incorporated any number of data readers that are arranged to provide optimized side shield data reader biasing and shielding structures.

Although not required or limiting, FIGS. 5A & 5B convey an example data reader fabrication routine 200 carried out in accordance with various embodiments to construct a data reader tuned to a predetermined data storage environment. The routine 200 begins by depositing a leading shield onto a substrate followed by a fixed magnetization structure portion of a magnetoresistive stack in step 202. Example reader 250 of FIG. 5B illustrates a portion of a leading shield 252 and a fixed magnetization structure 254 that can be respectively tuned for thickness, material, number of layers, and magnetic characteristics, such as magnetic moment and uniaxial anisotropy, without limitation.

Next, step 204 successively forms a non-magnetic layer 262, magnetically free layer 264, cap layer 266, and first mask layer 268 onto the stack fixed magnetization structure, as shown in reader 260 of FIG. 5B. The various layers created in step 204 can be different materials and thicknesses to ensure protection and magnetic operation of the magnetically free structure. A second mask layer 270 is then deposited in step 206 atop the first mask layer to allow step 208 to pattern portions of the first and second mask layers.

Reader 280 depicts how removing less than all the material of each layer can respectively shape the second 270 and first 268 mask layers.

Step 210 proceeds to form side shields on lateral sides of the magnetoresistive stack. It is noted that step 210 can remove portions of the non-magnetic layer, free layer and cap layer, to provide a rectangular, curvilinear, or trapezoidal shape for a portion of the magnetoresistive stack. As shown in reader 290 of FIG. 5B, the formation of the side shields can involve the deposition of one or more non-magnetic gap layers 292 that separate the side shields 294 from the free structure 264, fixed magnetization structure 254, cap layer 266, and first mask layer 268.

Routine 200 advances to step 212 where the second mask layer is removed to produce the planar top stack surface 302 illustrated by reader 300. Various embodiments utilize different material removal means, such as reactive etching and polishing, that ensure the cap layer remains intact and protecting the stack free layer. That is, material removal processes can be selectively utilized to remove one layer at a time without removing any portions of the cap layer that protects the magnetically free layer of the stack.

With the planar reader surface 302 being prepared, step 214 deposits a fixed magnetization structure that acts as part of a trailing shield. The fixed magnetization structure can be any number of materials and layers that are coupled to the side shields without being coupled to the stack free layer. Reader 310 of FIG. 5B displays how a fixed magnetization structure 312 contacts the cap layer 266 and respective side shields 294. It is noted that some embodiments configure the steps 212 and 214 to remove less than all the first mask layer so that a bi-layer cap is present between the shield fixed magnetization structure and the magnetically free layer with the first mask layer having a smaller thickness than the cap layer.

Finally, at least one shield layer is deposited on the shield fixed magnetization structure to complete the data reader, as shown by layer 314 in reader 310. It is noted that the various steps of routine 200 and representative illustrations of FIG. 5B are merely exemplary and are not required. As such, any step can be modified or removed just as any step or decision can be inserted without limitation. For example, at least one additional step can incorporate the completed data reader into a transducing head while another step may utilize the data reader to sense data bits in a hard disk drive data storage environment.

Through the various data reader cap embodiments, a magnetoresistive stack can be fabricated with smaller dimensions while the magnetically free layer of the stack remains protected. The utilization of a mask sub-layer can act in concert with a mask to allow for a thinner cap layer and reduced reader offset. The ability to tune the cap for materials and numbers of layers allows data reader fabrication to minimize shadowing and redeposition effects that increase the width of the reader on the ABS and decrease the possible data track resolution on a data storage device.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
    depositing a magnetoresistive stack having a magnetically free layer;
    forming a cap layer atop the magnetically free layer, the cap layer comprising a first material inert to reactive etching;
    depositing a first mask layer on the cap layer;
    forming a second mask layer on the first mask layer, the first and second layers being independently definable;
    patterning the first and second mask layers to a common reduced width;
    patterning the magnetoresistive stack;
    depositing an isolation structure and side shield structure;
    removing the second mask layer, the second mask layer contacts the first mask layer prior to removal of the first mask layer, the second mask layer selected to be removed by a technique that will not remove the first mask layer;
    removing the first mask layer; and
    depositing a shield in contact with the cap layer, the cap layer decoupling the magnetically free layer from the shield.

2. The method of claim 1, wherein the first mask layer is removed with a different material removal process than the second mask layer.

3. The method of claim 2, wherein the second mask layer is removed with a reactive etch material removal process, the first mask layer being inert to the reactive etch material removal process.

4. The method of claim 3, wherein the first mask layer is patterned prior to removal.

5. The method of claim 3, wherein the reactive etch material removal process comprises an inductively coupled plasma.

6. The method of claim 1, wherein the first mask layer protects the cap layer and magnetically free layer during at least one subsequent process prior to deposition of the shield.

7. The method of claim 6, wherein the first mask layer is removed immediately prior to shield deposition.

8. The method of claim 1, wherein the first mask layer masks the cap layer from a material removal process that removes the second mask layer.

9. A method comprising:
    depositing a magnetoresistive stack having a magnetically free layer;
    forming a cap layer atop the magnetically free layer, the cap layer having a thickness of 4 nm or less as measured parallel to a longitudinal axis of the magnetoresistive stack on an air bearing surface (ABS), the cap layer comprising a first material inert to reactive etching;
    depositing a first mask layer on the cap layer, the first mask layer comprising a second material that is stable at a room temperature and decomposes at an elevated temperature;
    forming a second mask layer on the first mask layer, the first and second layers being independently definable;
    patterning the first and second mask layers to a common reduced width;
    patterning the magnetoresistive stack;
    depositing an isolation structure and side shield structure;
    removing the second mask layer;
    removing the first mask layer; and depositing a shield in contact with the cap layer, the cap layer decoupling the magnetically free layer from the shield.

10. The method of claim 9, wherein the first mask layer has a vertical sidewall oriented parallel to the longitudinal axis of the magnetoresistive stack.

11. The method of claim 9, wherein the cap layer and first mask layers are different materials.

12. The method of claim 9, wherein the cap layer comprises a first polish stop material and the second material is removed by reactive etch.

13. The method of claim 9, wherein the magnetoresistive stack comprises a fixed magnetization structure having a greater width than the magnetically free layer.

14. The method of claim 9, wherein the magnetoresistive stack is disposed between and separated from first and second side shields along a transverse axis oriented perpendicular to the longitudinal axis.

15. The method of claim 9, wherein the second mask layer contacts the first mask layer prior to removal of the first mask layer, the second mask layer selected to be removed by a technique that will not remove the first mask layer.

16. The method of claim 9, wherein the first mask layer comprises an oxide.

17. A method comprising:
depositing a magnetoresistive stack having a magnetically free layer;
forming a cap layer atop the magnetically free layer, the cap having a thickness of 4 nm or less as measured parallel to a longitudinal axis of the magnetoresistive stack on an air bearing surface (ABS), the cap layer comprising a first material inert to reactive etching;
depositing a first mask layer on the cap layer;
forming a second mask layer on the first mask layer, the first and second layers being independently definable;
patterning the first and second mask layers to a common reduced width as measured perpendicular to the longitudinal axis of the magnetoresistive stack on the ABS;
patterning the magnetoresistive stack, the magnetoresistive stack having a reader width as measured perpendicular to the longitudinal axis of the magnetoresistive stack on the ABS, the reader width being greater than the common reduced width;
depositing an isolation structure and side shield structure;
removing the second mask layer;
removing the first mask layer; and
depositing a shield in contact with the cap layer, the cap layer decoupling the magnetically free layer from the shield.

18. The method of claim 17, wherein the first mask layer comprises CuN.

19. The method of claim 17, wherein the first mask layer comprises a nitride material.

20. The method of claim 17, wherein the shield comprises a fixed magnetization structure.

* * * * *